(12) United States Patent
Eriksson

(10) Patent No.: US 6,594,137 B2
(45) Date of Patent: Jul. 15, 2003

(54) CAPACITOR ELEMENT FOR A POWER CAPACITOR, A METHOD FOR MANUFACTURING THE SAME AND A POWER CAPACITOR COMPRISING SUCH CAPACITOR ELEMENT

(75) Inventor: Esbjorn Eriksson, Ronninge (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/181,147

(22) Filed: Oct. 2, 2002

(65) Prior Publication Data

US 2003/0103318 A1 Jun. 5, 2003

(30) Foreign Application Priority Data

Jan. 14, 2000 (SE) ................................................ 0000112

(51) Int. Cl.⁷ ................................................ H01G 4/20
(52) U.S. Cl. ................................................ 361/312
(58) Field of Search ................................ 361/311, 312, 361/313, 306.3, 524, 534, 321.2, 530

(56) References Cited

U.S. PATENT DOCUMENTS 1,900,018 A * 3/1933 Lilienfeld .................... 330/309
5,777,839 A * 7/1998 Sameshima et al. ......... 361/311
5,920,454 A * 7/1999 Nomura et al. .............. 361/313

FOREIGN PATENT DOCUMENTS

| EP | 0 225 822 B1 | 7/1990 |
| EP | 0 789 371 A1 | 8/1997 |
| GB | 2 026 241 A | 1/1980 |
| GB | 2 276 765 A | 10/1994 |

* cited by examiner

*Primary Examiner*—Anthony Dinkins
(74) *Attorney, Agent, or Firm*—Nixon & Vanderhye P.C.

(57) ABSTRACT

A capacitor element for a power capacitor having a plurality of films of dielectric material forming two adjacent dielectric layers, and also a plurality of electrodes of metal material, two of which are situated between the two adjacent dielectric layers spaced from and beside each other to produce and area which is free from metal material. According to the invention a permanent connection of a dielectric material is arranged in the area and unites the dielectric layers with each other. The invention also relates to a method for producing such a capacitor element, and a power capacitor having such a capacitor element.

21 Claims, 7 Drawing Sheets

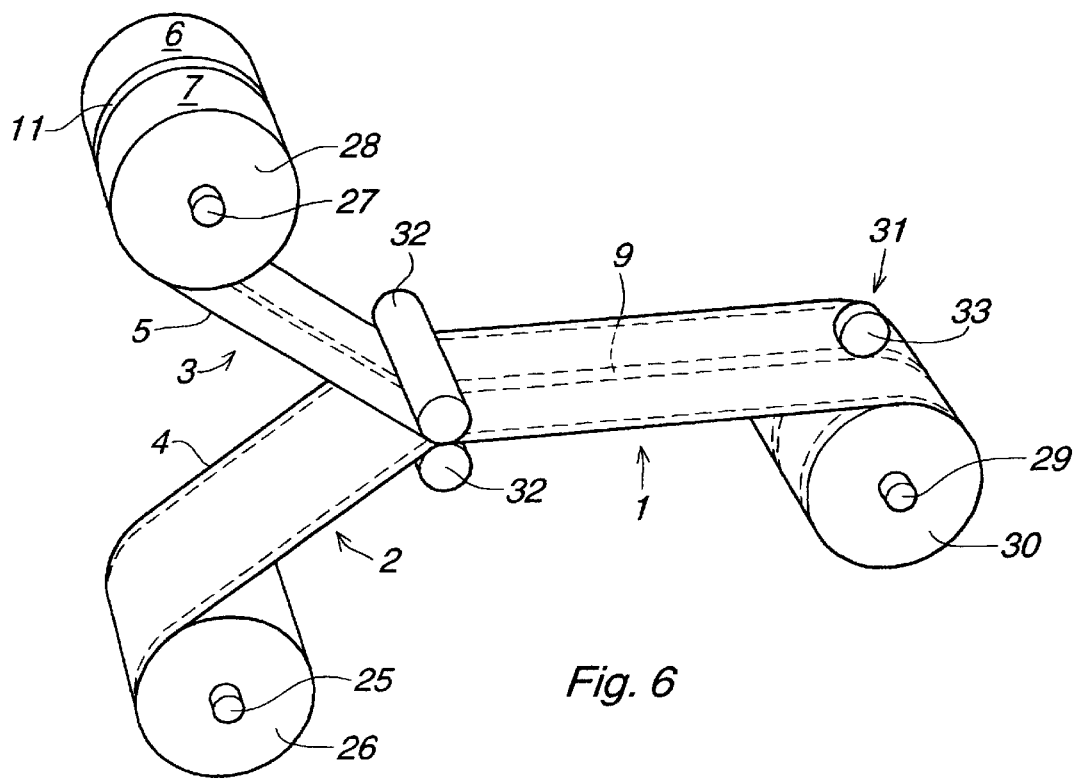
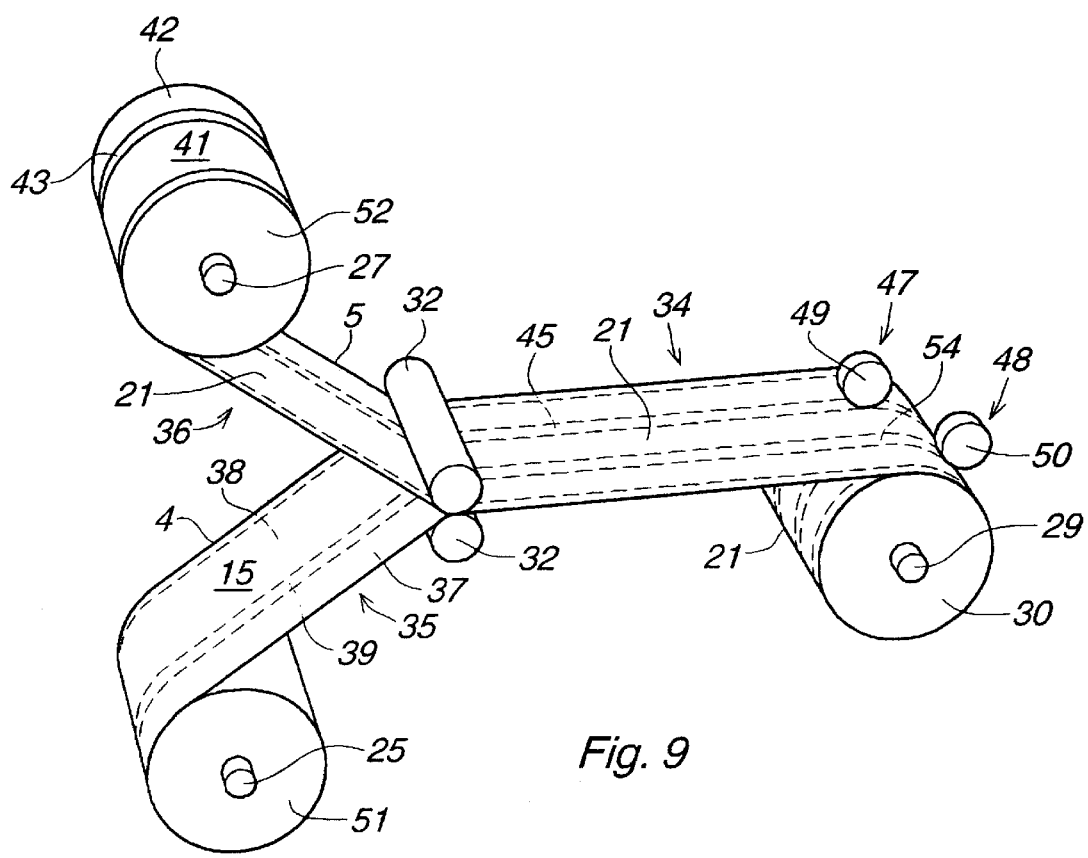

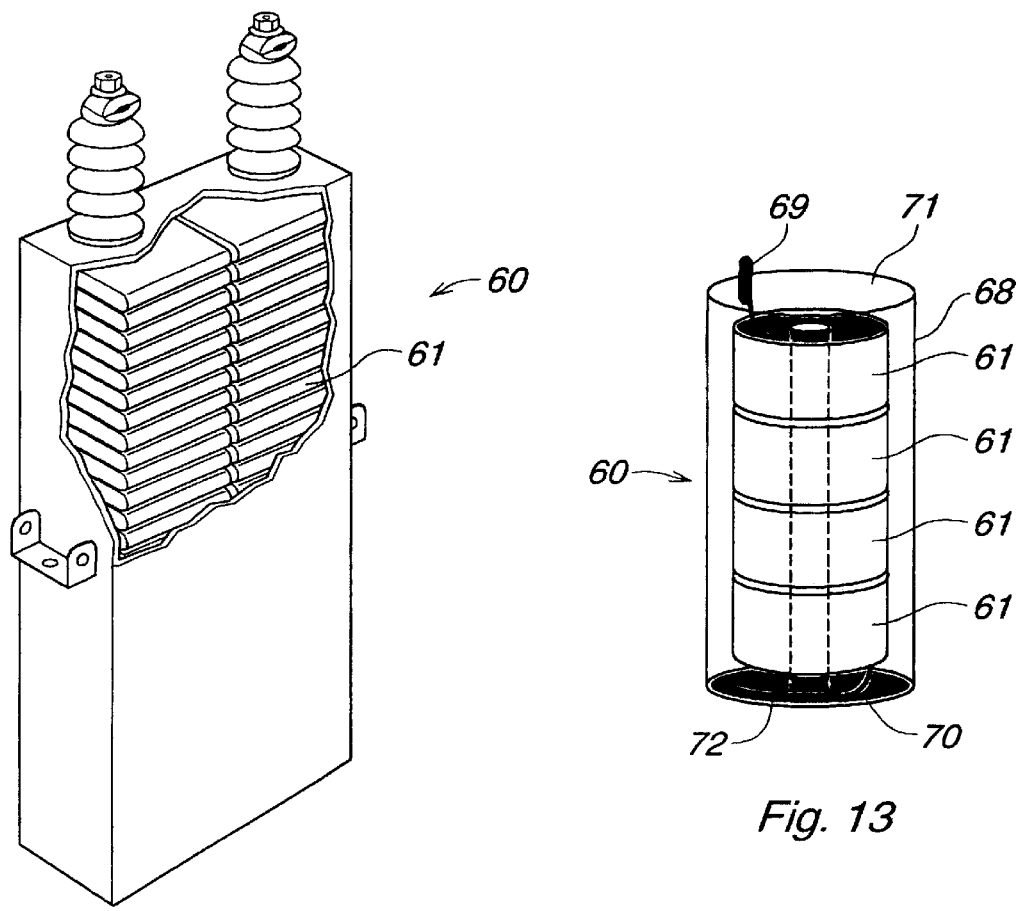
Fig. 11
Fig. 13
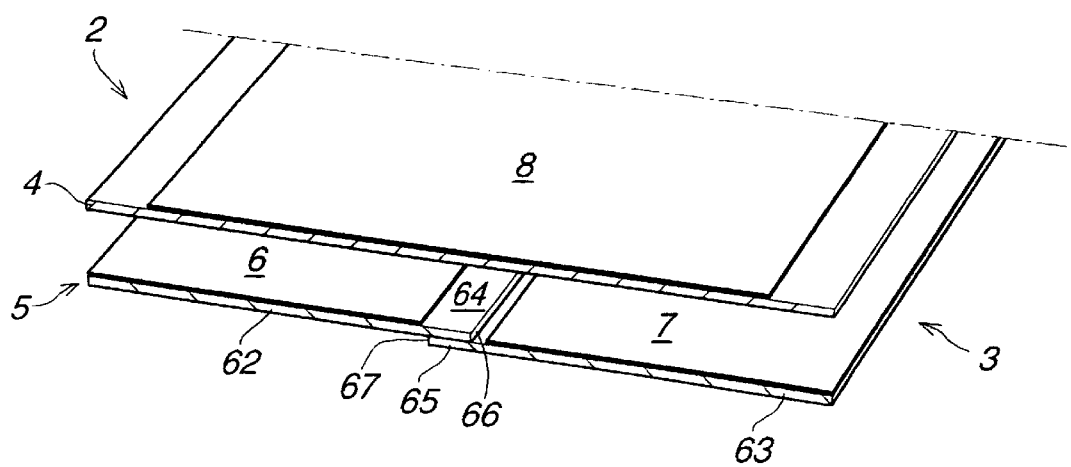
Fig. 12

CAPACITOR ELEMENT FOR A POWER CAPACITOR, A METHOD FOR MANUFACTURING THE SAME AND A POWER CAPACITOR COMPRISING SUCH CAPACITOR ELEMENT

This application is the U.S. national phase of international application PCT/SE01/00036 filed Jan. 11, 2001, which designated the U.S.

TECHNICAL FIELD

The present invention relates to a capacitor element for a power capacitor including a plurality of films of dielectric material, forming two adjacent dielectric layers, and also a plurality of electrodes of metal material, at least two such electrodes being situated between the two dielectric layers spaced from and alongside each other to define an area that is free from metal material.

The invention also relates to a method for manufacturing such a capacitor element, and a power capacitor comprising such a capacitor element.

In this context power capacitors refers to capacitors for alternating or direct current applications for voltages exceeding 1 kV, preferably at least 5 kV.

BACKGROUND ART

It is known to use self-healing films, with or without inner series connections, in capacitor elements for power capacitors for alternating and direct current applications. Such capacitor elements are known, for instance, from EP 0 225 822 B1, according to which the self-healing films have electrodes of varying thickness, and BP 0 789 371 A1, according to which the self-healing films have segmented, series-connected electrodes. Elongated films of a dielectric material are used in the production of such capacitor elements, said material being partially coated with a metal material to form one or more electrodes. Production entails laying a plurality, usually two, of such coated films one on top of the other and winding them to a roll so that the electrodes are capacitively connected together. A plurality of capacitor elements are coupled together in series and in parallel, and enclosed in a container, to produce the actual power capacitor. In order to increase the filling ratio of the power capacitor, the capacitor elements are in certain cases flattened before being coupled together and placed in the container. The dielectric material in the films of the capacitor element is usually polypropene or polythene terephthalate and the electrode material is usually aluminium, zinc or an alloy of these two.

The self-healing properties are obtained through selection of the dielectric films and electrodes so that, upon an electric discharge through any of the films, the electrodes are vaporized locally around the fault point, thus isolating the fault point electrically. The electrodes must be thin if the self-healing is to function, and the electrode material is therefore usually vaporized onto the film to form the electrode layers. The self-healing is most efficient if the dielectric films are thinner than about 15 micrometer, which means that the voltage across the films cannot be permitted to be very high. However, through internal series connection, it is possible to increase the voltage across the capacitor element without increasing the voltage across the films.

In order to achieve the internal series connection, the capacitor element has two or more electrodes that are arranged between two adjacent films, which electrodes are electrically insulated from each other by means of uncoated parts of the films. When the capacitor element is placed under voltage, these electrodes acquire different potentials so that voltage gradients occur along the boundary layer of the films between adjacent electrodes. If a flashover occurs between two adjacent electrodes this may short-circuit the capacitor element, making the capacitor element unusable. If the energy in the capacitor element is considerable such a short circuit may also damage adjacent capacitor elements and cause considerable damage to the power capacitor in which the capacitor element is included. To obtain the necessary electric strength, therefore, the width of the uncoated parts must be dimensioned so that flashover between the electrodes does not occur. Since the electric strength is considerably lower along the longitudinal surface of a film than transversely, substantial safety margins must be used for this dimensioning.

The requirement described above for high electric strength between electrodes with different potentials is, however, in conflict with the desire to minimize the area of the uncoated parts to increase utilization of volume and material in the capacitor element. A usual measure for increasing the electric strength between the electrodes is to completely or partially impregnate the capacitor element with a suitable impregnating fluid. The electric strength increased in this way can be utilized to decrease the area of the uncoated parts and/or increase the permissible voltage across the capacitor element. Generally, however, it is desirable to avoid impregnating fluid because of the risk of leakage and fire, environmental aspects, technical manufacturing aspects and so on.

DESCRIPTION OF THE INVENTION

The object of the present invention is to create a capacitor element which, in impregnated or unimpregnated state, offers better volume and material utilization and/or withstands a higher voltage than equivalent known impregnated or unimpregnated capacitor elements.

The capacitor element in accordance with the invention is characterized in that a permanent connection of a dielectric material is arranged in said area and unites the dielectric layers with each other.

The method in accordance with the invention is characterized in that said dielectric layers are united within said area by means of a permanent connection of a dielectric material.

The power capacitor in accordance with the invention is characterized in that a permanent connection of a dielectric material is arranged in said area and unites the dielectric layers with each other.

Improved electric strength in said area is obtained through the invention. This can be utilized to decrease the size of the area, thus contributing to better volume and material utilization in the capacitor element, and thus in the power capacitor. Alternatively, the improved electric strength may be used to increase the voltage over the capacitor element. Furthermore, thanks to the increased electric strength, unimpregnated instead of impregnated capacitor elements can be used in certain applications.

In accordance with one embodiment said connection is formed by one of said plurality of films.

In accordance with another embodiment of the invention the permanent connection is achieved by fusion of a plurality of said films in said area, which leads to the boundary layer between the films, which is sensitive from the electric strength aspect, completely or partially disappears.

In accordance with one embodiment the power capacitor according to the invention comprises a plurality of capacitor elements, that have substantially circular-cylindrical shape, are arranged close together so that their axial directions coincide, and are connected to each other so that they form a series-connected capacitor stack. In such a power capacitor for high voltage the technique of using inner series-connections in the capacitor elements is an obvious advantage since the number of series-connected capacitor elements can be reduced. The technique is particularly advantageous together with the technique mentioned above for self-healing. Since successful self-healing requires particularly thin metal coating and the currents flowing through the metal generate active power dissipation (heat), thinner layers result in higher losses. One way of reducing the losses without compromising the requirement for a thin metal coating is to choose a shape for the metallized film, and thus a shape for the capacitor element, such that the dimension of the metal coating perpendicular to the rolling direction is decreased and the length of the roll is increased. Unless internal series-connection is used, the consequence of this will be that the cylindrical capacitor elements acquire a relatively little height in relation to their diameter. Series-connecting many such elements, which is required for high voltage, becomes detrimental from the cost point of view. With inner series connections, therefore, several series-connected part-capacitors can automatically be built into a cylindrical capacitor element with an optimal relation between height and diameter, from the manufacturing aspect, and with good self-healing properties.

DESCRIPTION OF THE DRAWINGS

The invention will be described in more detail in the following with reference to the drawings, in which FIG. 6 shows schematically production equipment for manufacturing a capacitor element with internal series connection in accordance with the invention, FIG. 9 shows schematically production equipment for manufacturing a capacitor element with two internal series connections in accordance with the invention, FIG. 11 shows an embodiment of a power capacitor in accordance with the invention, FIG. 12 shows another embodiment of two part-tapes for producing a capacitor element in accordance with the invention, FIG. 13 shows a second embodiment of a power capacitor in accordance with the invention.

DESCRIPTION OF EMBODIMENTS

Figure 1:
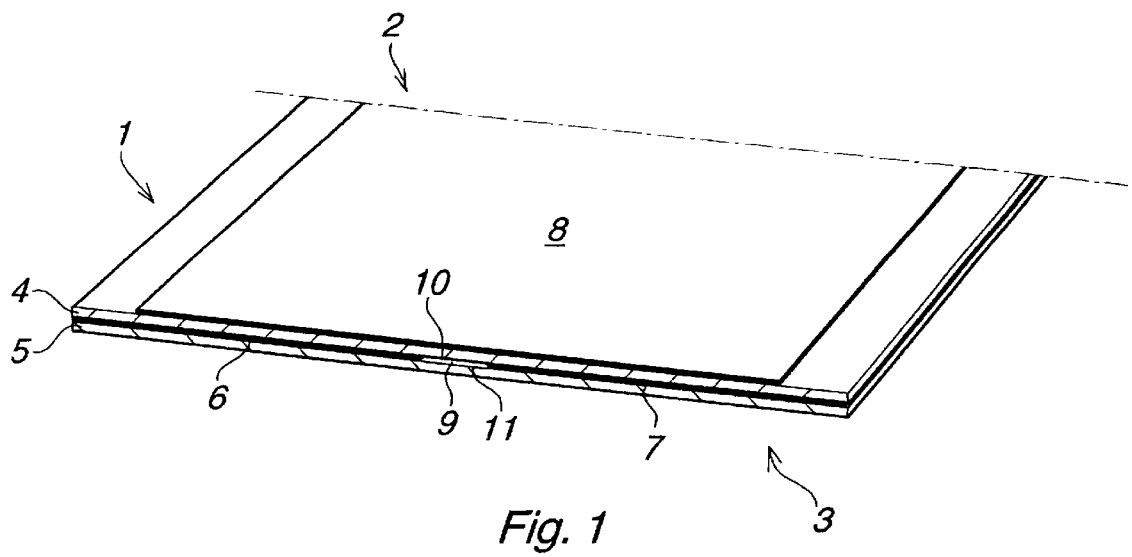
FIG. 1 shows schematically a section of a tape for producing a capacitor element with internal series connection.
Figure 2:
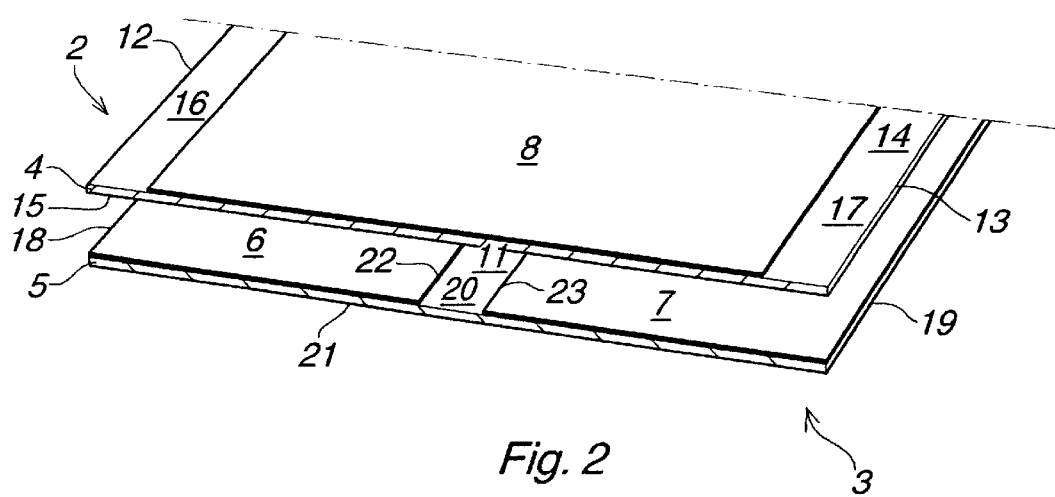
FIG. 2 shows schematically a first embodiment of part-tapes for producing a tape as shown in FIG. 1.

FIG. 1 shows schematically a section of a tape 1 for producing a capacitor element for a power capacitor, which tape 1 is produced by combining a first part-tape 2 and a second part-tape 3. A first embodiment of the part-tapes 2, 3, prior to laying them together, is shown in more detail in FIG. 2. The tape 1 consists of first and second continuous films 4, 5 of suitable dielectric material, and three separate electrodes 6, 7, 8 of suitable metal material. As can be seen in FIG. 1, the first and second electrodes 6, 7 are enclosed between the two films 4, 5, while the third electrode 8 is situated on one side of the tape 1. The two enclosed electrodes 6, 7 are electrically separated by means of a longitudinally running area 9 which is initially in the form of an enclosed gap that is formed when the two part-tapes 2, 3 are combined, and is thus defined by the two enclosed electrodes 6, 7 and opposing surface parts 10, 11 of the films 4, 5. Seen in the longitudinal direction of the tape, the three electrodes may be continuous or discontinuous. In the latter case the electrodes are divided into segments of predetermined dimension in the longitudinal direction of the tape so that two consecutive segments are either electrically connected by one or more fuse bridges or electrically separated by a space extending across the tape. In the embodiment shown in FIG. 1 the electrodes 6, 7, 8 are continuous. As can be seen in FIG. 2, said first part-tape 2 comprises said first film 4 and said third electrode 8, while said second part-tape 3 comprises said second film 5 and said first and second electrodes 6, 7. The first film 4 has two parallel edges 12, 13 running longitudinally and two surfaces 14, 15 facing away from each other and extending between said edges 12, 13. The surface 14 facing away from the second part-tape 3 is partially coated with a metal material in order to produce said third electrode 8 which has a predetermined width that is less than the width of the film 4 so that surface parts 16, 17 free from metallic electrode material are obtained nearest the edges 12, 13. The surface 15 facing the second part-tape 3 is completely free from metallic electrode material. The second film 5, which is substantially the same width as the first film 4, has two parallel edges 18, 19 running longitudinally and two surfaces 20, 21 facing away from each other that extend between said edges 18, 19. The surface 20 facing the first part-tape 2 is partially coated with a metal material to produce said two separated electrodes 6, 7 that extend from respective edges 18, 19. The two electrodes 6, 7 together have a predetermined width that is less than the width of the film 5 so that the surface part 11 mentioned in conjunction with FIG. 1 is obtained between the two facing inner edges 22, 23 of the electrodes 6, 7, the surface part 11 being free from metallic electrode material. The surface 21 facing away from the first part-tape 2 is completely free from metallic electrode material.

The metal material is preferably applied on the surfaces of the dielectric films in known manner using screen-printing or vaporizing technique. With the vaporizing technique an oil mask is applied on the surface by a rotating roller, after which the film is caused to pass before an opening through which vaporized metal is deposited on the surface as dictated by the mask. With the screen-printing technique the conducting electrode material is applied directly on the film from a suitably patterned roller. However, the invention is not limited to capacitor elements where the electrodes are vaporized or coated onto the dielectric films in some other way. Alternatively, the electrodes can consist of metal foils arranged between the dielectric film (see FIG. 16).

Figure 3:
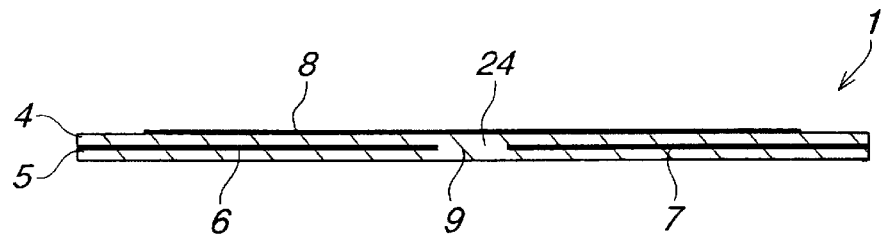
FIG. 3 shows an arbitrary cross section of a tape as it appears in a capacitor element with internal series connection in accordance with the invention.

FIG. 3 shows an arbitrary cross section of the tape 1 as it would appear in the capacitor element, before end connections have been added. The electrodes 6 and 8 are connected capacitively to each other and, in series with these, the electrodes 8 and 7 are connected capacitively to each other to produce internal series connection of the capacitor element in known manner. As is clear from the cross section in FIG. 3, the first film 4 and the second film 5 forms two dielectric layers that have, in accordance with the invention, been united within said area 9 by means of a bridge-like permanent connection 24 of a dielectric material. Since the two electrodes 6, 7 are continuous, said permanent connection 24 is also continuous, as will be realized from the fact that the cross section has been chosen arbitrarily in the longitudinal direction of the tape. The permanent connection 24, seen in cross section, may entirely fill what was initially the enclosed gap, as shown in FIG. 3, or partially fill it so that the gap, as well as the two facing surface parts 10, 11, completely or partially disappears. This gives improved electric strength in the area 9 between the two separated electrodes 6, 7. According to a preferred embodiment of the invention the permanent connection 24 is achieved by fusion of the opposing surface parts 10, 11 of the films 4, 5. A permanent connection is thus obtained in which the electric strength is on a parity with the electric strength of the films 4, 5. According to another embodiment of the invention the permanent connection is achieved with the aid of adhesive agent, e.g. a suitable glue, that joins the surface parts 10, 11 of the films 4, 5 together.

Figure 4:
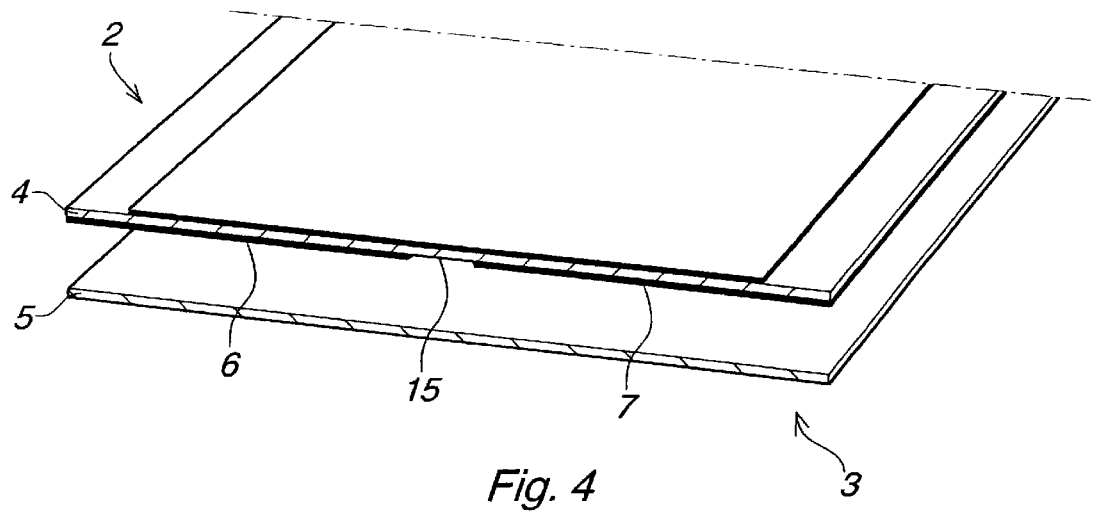
FIG. 4 shows schematically a second embodiment of part-tapes for producing a tape as shown in FIG. 1.
Figure 5:
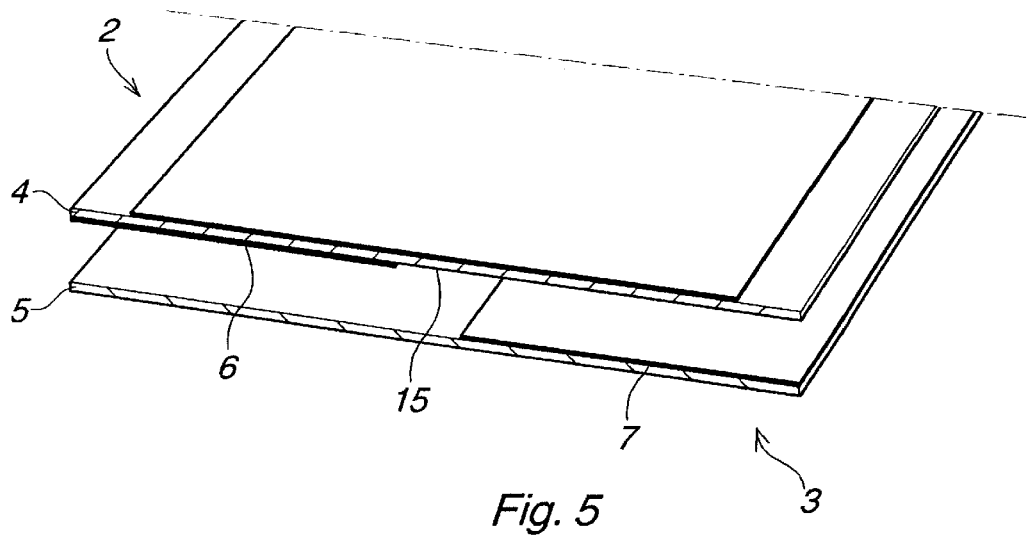
FIG. 5 shows schematically a third embodiment of part-tapes for producing a tape as shown in FIG. 1.

The tape 1 shown in FIG. 1 can be produced by laying together other part-tapes than the part-tapes 2, 3 illustrated in FIG. 2. FIGS. 4 and 5 illustrate examples of such other part-tapes. FIG. 4 shows a second embodiment of two part-tapes for producing the tape shown in FIG. 1, where the first and second electrodes 6, 7 are applied on the surface 15 of the film 4 facing towards the second part-tape 3. FIG. 5 shows a third embodiment of two part-tapes for producing the tape illustrated in FIG. 1, where the first electrode 6 is applied on the surface 15 of the film 4 facing towards the second part-tape 3.

A method for manufacturing a capacitor element using a tape 1 in accordance with FIG. 3 is described in the following with reference to FIG. 6 which shows schematically suitable production equipment. The production equipment comprises a first rotatable shaft 25 for a first roll of material 26, a second rotatable shaft 27 for a second roll of material 28, a rotatable storage shaft 29 for winding the tape 1 to form a capacitor element 30, a heat generator in the form of a plastics welder 31 and two guide rolls 32 arranged close together. When manufacturing the capacitor element 30 a roll of part-tape 2 in accordance with FIG. 2 is placed on the shaft 25 and a roll of the part-tape 3 in accordance with FIG. 2 is placed on the shaft 27. The part-tapes 2, 3 run towards the guide rolls 32 where they are laid together and produce a tape 1 in accordance with FIG. 1, whereupon said area 9 in the form of said gap is produced by being enclosed between the electrodes 6, 7 of the second part-tape 3 and the facing surface parts 10, 11 of the films 4, 5. The tape 1 passes the plastics welder 31 which includes an active part 33 heated to a suitable temperature which is in the form of a roll having a predetermined width that is somewhat less than the width of the area 9. The plastics welder 31 is so placed that the active part 33 rolls along the tape 1 opposite the area 9. As the tape 1 passes the active part 33 this heats the films 4, 5 locally so that they fuse together and completely fill said gap, whereupon they solidify and a permanent connection 24 is produced in the area 9, as shown in FIG. 3. Instead of a device generating heat with a active part that physically comes into contact with the tape as described above, a heat generating device may alternatively be used that achieves welding of the plastic without contact, such as a heat generator that utilizes ultrasound or laser technology. To prevent the enclosed electrodes 6, 7 being damaged during fusion of the films 4, 5 it must be ensured that the heat supply is localized to the area 9. This is preferably achieved by means of a cooling trap (not shown). This is suitably in the form of one or a plurality of cooled rollers that are pressed against the tape 1 opposite said electrodes 6, 7 immediately prior to or after the active part 33 of the welding device 31. Together with the active part 33 these rollers may also be used to check the winding tension of the tape C, which is an important parameter when manufacturing wound capacitor elements. When the films 4, 5 have been fused together the tape 1 is wound onto the storage shaft 29 so that the first part-tape 2 forms inner turns and the second part-tape 3 outer turns, i.e. so that the surface 14 of the first film 4 faces the storage shaft 29 and the surface 21 of the film 5 faces the exterior of the capacitor element 30.

If the permanent connection is achieved by using an adhesive agent the adhesive agent is preferably applied to the surface parts 10, 11 of one or both films 4, 5 before the part-tapes 2, 3 are laid together to produce the tape 1, i.e. before the guide rolls 32. The adhesive agent is preferably applied by a device in contact with the surface parts 10, 11 of the part-tapes 2, 3.

FIG. 12 shows yet another embodiment of two part-tapes 2, 3 for producing a capacitor element comprising the tape 1 shown in FIG. 3. The first part-tape 2 in FIG. 12 is identical to the first part-tape 2 shown in FIG. 2. In the other part-tape 3 the film 5 is composed of two film-parts 62, 63 of dielectric material. Each film-part 62, 63 is partially coated with an electrode 6, 7 of metal material on the side facing the first part-tape 2. Each film-part 62, 63 has an uncoated edge part 64, 65 that extends along the longitudinally running edge 66, 67 facing the opposing film-part 63, 62. As can be seen in FIG. 12, the film-parts 62, 63 are arranged so that the uncoated edge parts 64, 65 partially overlap each other. When producing a capacitor element from the part-tapes 2, 3 in FIG. 12 the part-tapes 2, 3 are wound to a roll, the overlapping edge parts 64, 65 being subjected locally to a high pressure and thereby compressed so that they spread into and fill the area 9 between the electrodes 6, 7, shown in FIG. 3. The edge parts 64, 65 are thus united with each other and with the film 4 of the first part-tape 2 and produce the permanent connection 24 shown in FIG. 3. The quantity of filler material available is controlled by the degree of overlap, i.e. the greater the overlap the more material will be available. In this context it is important that the winding tension is high so that the overlapping edge parts 64, 65 and the film 4 are joined together. The method described above may be combined with the method described earlier using a heat generator for local heating of the area between the electrodes 6, 7. The method may also be combined with a method comprising the adhesive agent mentioned earlier. More than two film-parts are preferably used for the part-tapes if a capacitor element with two or more internal series connections is desired.

The invention can naturally be extended to include films having two or more internal series connections, in which case the production equipment should preferably include means for producing permanent connections between the films at all internal series connections of the capacitor element.

Figure 7:
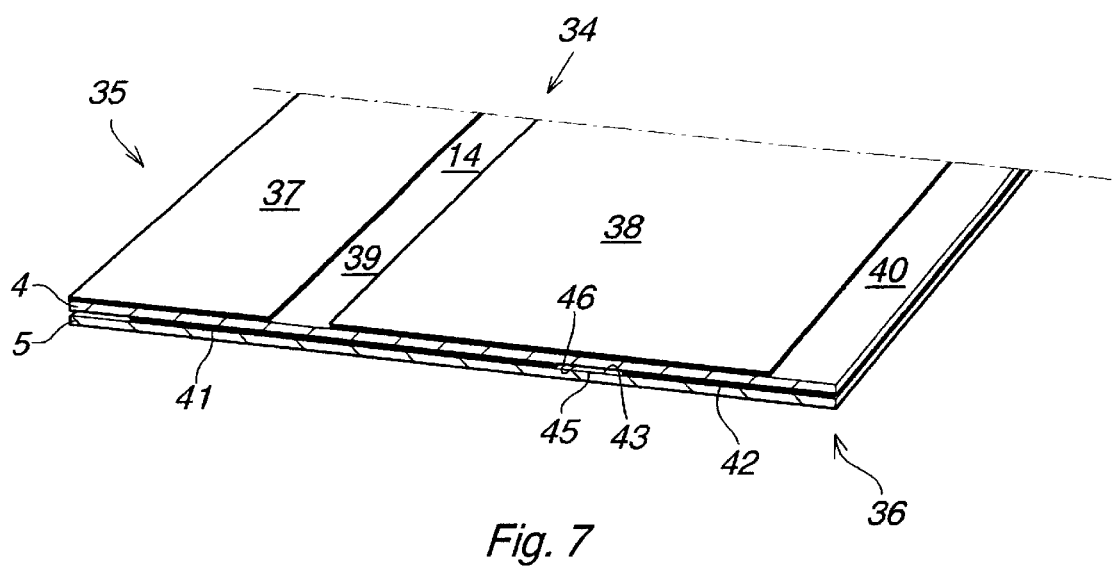
FIG. 7 shows schematically a section of a tape for producing a capacitor element with two internal series connections.
Figure 8:
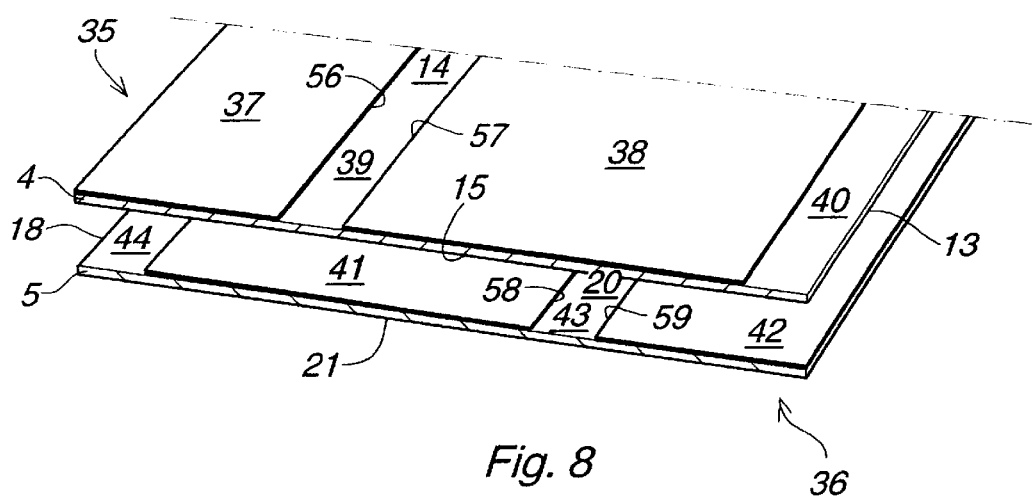
FIG. 8 shows schematically a first embodiment of part-tapes for producing a tape as shown in FIG. 7.

FIG. 7 shows a tape 34 for producing a capacitor element with two internal series connections. The tape 34 is produced by combining two part-tapes 35, 36, as shown in FIG. 8. The first part-tape 35 has a dielectric film 4 which is partially coated with two continuous electrodes 37, 38 on the surface 14 facing away from the other part-tape 36. The electrodes 371 38 extend in the longitudinal direction of the part-tape 35 and are arranged on the surface 14 so that a longitudinally running surface part 39 free from metal material is obtained between the electrodes 37, 38, and a longitudinally running surface part 40 free from metal material is obtained along one of the longitudinally running edges 13 of the film 4. The surface part 39 is consequently limited by two facing inner edges 56, 57 of the electrodes 37, 38. The surface 15 of the film 4, facing towards the second part-tape 36, is completely free from metallic electrode material. The second part-tape 36 has a dielectric film 5 which is partially coated with two continuous electrodes 41, 42 on the surface 20 facing the first part-tape 35. In the same way as the first part-tape 35, the electrodes 41, 42 extend in the longitudinal direction of the part-tape 36 and are so arranged on the surface 20 that a longitudinally running surface part 43 free from metal material is obtained between the electrodes 41, 42, and a longitudinally running surface part 44 free from metal material is obtained along one of the longitudinally running edges 18 of the film 5. The surface part 43 is consequently limited by two facing inner edges 58, 59 of the electrodes 41, 42. The surface 21 of the film 5, facing away from the first part-tape 35, is completely free from metallic electrode material. When the part-tapes 35, 36 are combined a first area 45 is produced in the form of a gap enclosed between the electrodes 41, 42, the surface part 43 and a surface part 46 of the surface 15 of the film 4 facing the surface part 43.

Production equipment for manufacturing a capacitor element with two internal series connections is shown in FIG. 9. Like the production equipment shown in FIG. 6, the production equipment in FIG. 9 comprises a first rotatable shaft 25, a second rotatable shaft 27, a rotatable storage shaft 29 for the capacitor element 30 and two guide rolls 32. The production equipment also comprises two heat-generating devices in the form of a first plastics welder 47 and a second plastics welder 48, each of which comprises an active part 49, 50 heated to a suitable temperature. When manufacturing the capacitor element 30 a roll 51 of the first part-tape 35 shown in FIG. 8 is placed on the shaft 25 and a roll 52 of the second part-tape 36 shown in FIG. 8 is placed on the shaft 27. As in the method described earlier in conjunction with FIG. 6, the part-tapes 35, 36 are guided to the guide rolls 32 where the part-tapes 35, 36 are laid together to produce the tape 34, whereupon the area 45 shown in FIG. 7 is produced. The tape 34 passes the active part 49 of the plastics welder 47 which, as in the method described earlier, forms a first permanent connection 53 (see FIG. 10) of a dielectric material in the area 45 between the films 4, 5 of the tape 34. The tape 34 is then wound to a roll so that the lower side of the tape 34, i.e. the side on which the electrodes 37, 38 are situated, is in contact with previous turns of the tape 34, i.e. with the surface 21 of the second film 5. A second area 54 is thus produced in the form of an enclosed gap defined by the electrodes 37, 38, the surface part 39 and an edge part (not visible) of the surface 21 of the film 5 facing the surface part 39. The enclosed gap passes the active part 50 of the plastics welder 48, where the films 4, 5 are heated locally in the area 54 so that they fuse together and completely fill the gap. When the films 4, 5 have solidified a second permanent connection 55 (see FIG. 10) of a dielectric material is produced in the area 54 between the dielectric layers formed by the films 4, 5. Since the plastic welder 48 must supply heat to the area 54 through the electrode 41 it is important that efficient cooling traps (not visible) conduct excess heat away from the electrode 41 so that this is not damaged.

Figure 10:
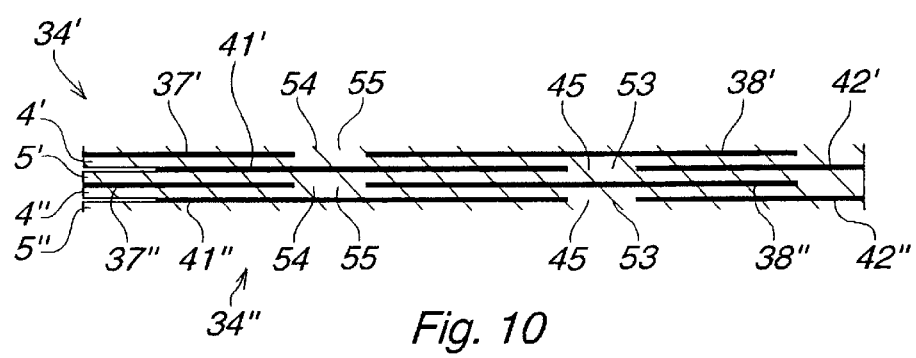
FIG. 10 shows an arbitrary cross section through two consecutive turns of a tape as used in a capacitor element having two internal series connections in accordance with the invention.

FIG. 10 shows an arbitrary cross section through a capacitor element manufactured in accordance with the method described above in conjunction with FIG. 9. FIG. 10 shows two consecutive layers of the tape 34', 34", in which the two uppermost films 4', 5' pertain to one layer and the two lowermost films 4", 5" pertain to the other layer. In each layer the dielectric layers, i.e. the films 4', 5'; 4", 5", in the area 45', 45" are joined together by the permanent connection 53', 53". Each layer of the tape 34', 34" is united with adjacent layers in the area 54 through the permanent connection 55. In this embodiment, thus, the film 4" is adjacent to the film 5" and the film 5', and the film 5' is adjacent to the film 4" and the film 4'.

Figure 16:
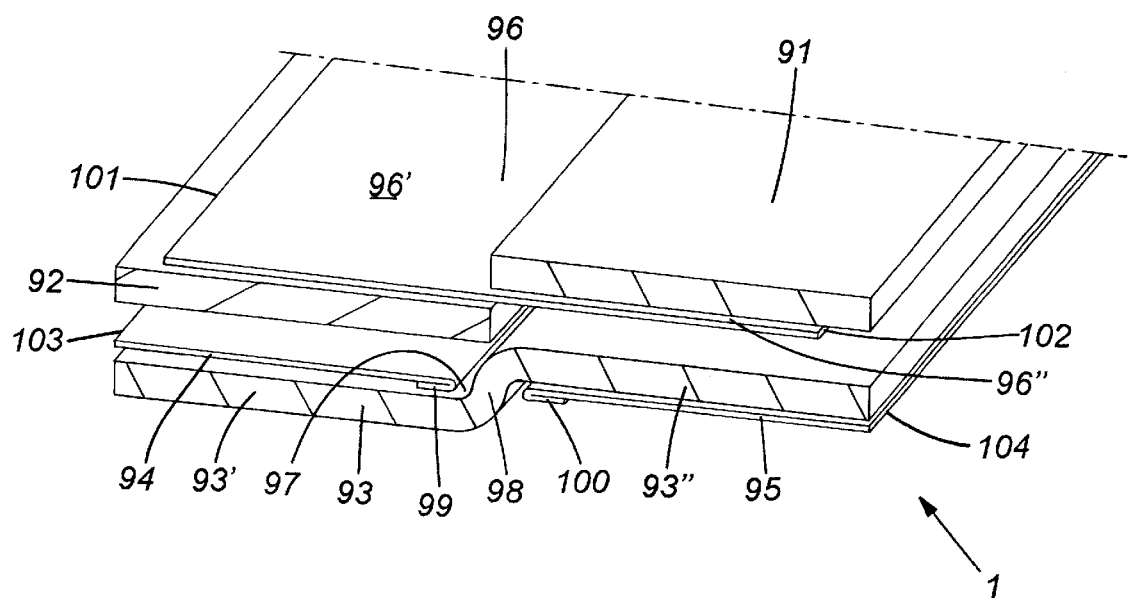
FIG. 16 shows schematically a section of a tape for producing a capacitor element with one internal series connection.

FIG. 16 shows an alternative embodiment of a tape 1 for producing a capacitor element with an internal series connection. The tape 1 comprises first, second, and third continuous films 91, 92, 93 of dielectric material, as well as first, second, and third electrodes 94, 95, 96 of metal material. The capacitor element is in this case of so-called film-foil type, i.e. the electrodes 94, 95, 96 consist of continuous metal foils of aluminium. The first film 91 and the second film 92 are substantially of equal width and the third film 93 is approximately twice as wide as these. The first and second electrodes 94, 95 each have a width that is somewhat less than half the width of the third film 93, and the third electrode 96 has a width that is somewhat less than the combined widths of the first and second films 91, 92. As illustrated in FIG. 16, the first and second electrodes 94, 95 are situated alongside and spaced from each other on either side of the third film 93. More particularly, the first electrode 94 is situated on one side of the third film 93, on the top side of the film 93 in FIG. 16, and there connects to the left half 93' of the third film 93. The second electrode 95 is situated on the other side of the third film 93, on the bottom side of the film 93 in FIG. 16, and there connects to the right half 93" of the third film 93. The second film 92 is situated on the first electrode 94. In other words, the first electrode 94 is situated between the left half 93' of the third film 93 and the second film 92. The third electrode 96 is situated partly on the second film 92, where the left half 96' of the third electrode 96 connects to the top side of the second film 92, and partly on the right half 93" of the third film 93, where the right half 96" of the third electrode 96 connects to the right half 93" of the third film 93. The first film 91 is located on the right half 96" of the third electrode 96. To produce the capacitor element, the tape 1 is wound to form a roll, in which the first film 91 connects to the second electrode 95 and the left half 93' of the third film 93 connects to the left half 96' of the third electrode 96. Consequently, the second electrode 95 is thereby enclosed between the first film 91 and the right half 93" of the third film 93. In the wound capacitor element, the left half 93' of the third film 93 and the first film 91 together form a first dielectric layer, and the second film 92 and the right half 93" of the third film 93 form a second dielectric layer. The electrodes 94 and 95 are arranged between these dielectric layers and between them define an area 97 that is free from metal material, which area 97 is substantially filled with the middle part 98 of the third film 93. In other words, the middle part 98 of the third film 93 forms a permanent connection between the dielectric layers, whereby good electric strength is obtained in the area 97 between the first and second electrode 94, 95. To further increase the electric strength at the long sides of the electrodes 94, 95, 96, these can be folded over, as illustrated in respect of the inner long sides 99, 100 of the first and second electrodes 94, 95. Alternatively, the long sides of the electrodes 94, 95, 96 can be unfolded, as illustrated in respect of the long sides 101, 102 of the third electrode 96, thus allowing a simpler construction of the capacitor element, albeit with reduced electric strength. The outer long sides 103, 104 of the first and second electrodes are arranged to be flame-sprayed or to be connected electrically in some other way to form the connection points of the capacitor element. Preferably, the capacitor element of film-foil type described above is impregnated with a suitable impregnation medium, which further improves the electric strength of the capacitor element.

FIG. 11 shows a first embodiment of a power capacitor 60 in accordance with the invention, which power capacitor 60 comprises a plurality of capacitor elements 61 of the type described above having united films, connected together. The power capacitor 60 is otherwise constructed in conventional manner with a container of metal and porcelain or polymer bushings. The capacitor elements 61 are conventionally wound to rolls and flattened.

FIG. 13 shows a second embodiment of a power capacitor 60 in accordance with the invention. The power capacitor 60 comprises a plurality of capacitor elements 61, in this case four, of the type described above having united films. The capacitor elements 61 are substantially circular-cylindrical in shape and are arranged one on top of the other so that their axial directions coincide. Adjacent capacitor elements 61 are electrically connected at their end surfaces so that the capacitor elements 61 form a series-connected stack. The power capacitor 60 also includes a container 68, substantially circular-cylindrical in shape, in which the stack of capacitor elements 61 is enclosed so that the axial directions of capacitor elements 61 and container 68 coincide. The capacitor elements at the ends of the stack are electrically connected to connectors 69, 70, respectively, running through each end part 71, 72 of the container. The connectors 69, 70 form the power capacitor's connection terminals. The container 68 is preferably made of an electrically insulating material.

Figure 14:
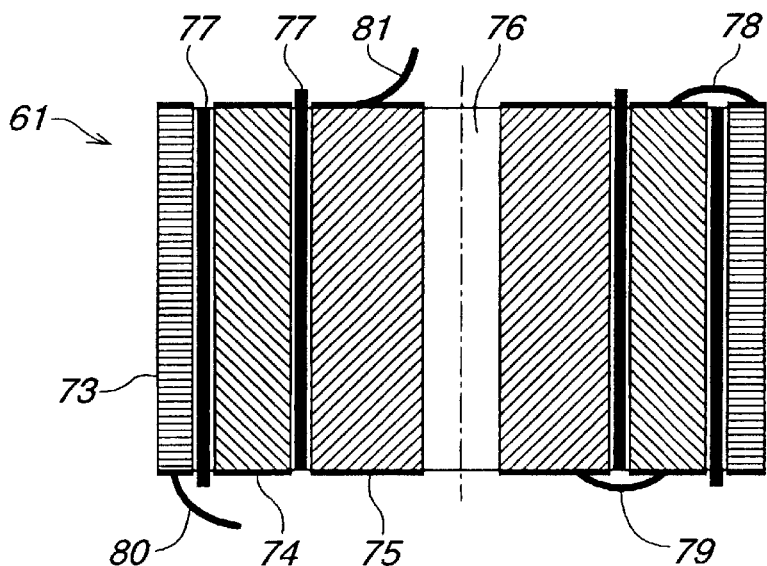
FIG. 14 shows a longitudinal section through an alternative embodiment of a capacitor element.

FIG. 14 shows in longitudinal section an alternative embodiment of a capacitor element 61 of the type described above with united films. The capacitor element 61 is divided into three sub-elements 73, 74, 75 arranged concentrically and having a common axis. The outermost sub-element 73 is substantially tubular and surrounds the middle sub-element 74 with a small gap between them. The middle sub-element 74 surrounds the innermost sub-element 75 in similar manner. In other words, the outer of radially adjacent sub-elements has a central channel running through it which is substantially circular-cylindrical in shape and closely abuts the inner sub-element. The innermost sub-element 75 has a central channel 76 running through it. The various sub-elements have different radial thicknesses, the one having the smallest thickness being outermost. They thus have substantially the same capacitance. Insulation 77 is arranged between the sub-elements 73, 74, 75. The sub-elements 73, 74, 75 are connected in series. Two radially adjacent sub-elements have one of their connection points at the same end. The outermost sub-element 73 is thus connected by means of the coupling device 78 to the middle sub-element 74 at one end of the capacitor element 61, and the middle sub-element 74 is connected by means of the coupling device 79 to the innermost sub-element 75 at the other end of the capacitor element 61. The connections 80, 81 for the capacitor element 61 are thus located one at each end thereof. If the number of sub-elements is greater than three, e.g. five or seven, connection of the coupling points at the ends of the sub-elements should be continued alternately.

Figure 15:
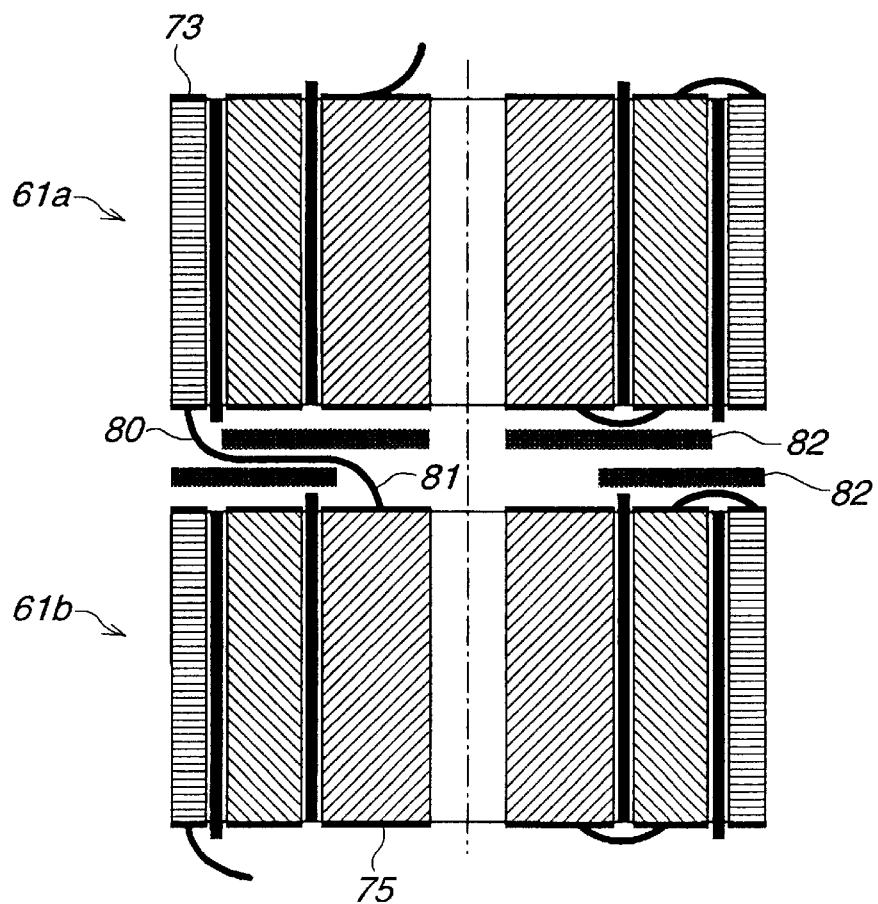
FIG. 15 shows two series-connected capacitor elements of the type shown in FIG. 14.

FIG. 15 illustrates how a plurality of capacitor elements of the type shown in FIG. 14 are connected together in series. The figure shows two such elements 61a, 61b. The connection 81 from the lower capacitor element 61b at the upper end of the inner sub-element 75 is coupled to the connection 80 of the upper capacitor element 61a at the lower end of the outer sub-element 73. Insulation 82 is arranged between the capacitor elements 61a, 61b to withstand the potential differences arising in this type of capacitor.

The invention may be extended to cover a union of the films by means of a permanent connection in gaps other than those defining inner series connections, such as between segmented electrode layers having the same potential. Permanent connections extending substantially transversely to the longitudinal direction of the tape can then be obtained. If the capacitor element is wound to a roll so that turns of dielectric film are arranged against each other, the invention can also be extended to uniting the surface parts 40 and 44 of FIGS. 7 and 8 with opposing surface parts of opposing films with a permanent connection, as shown in the right-hand part of FIG. 10.

Typical dimensions for a capacitor element in the form of a roll are a diameter of 100–300 mm, a bore diameter of 20–90 mm, preferably at least 30 mm, and a height of 50–800 mm. Such a capacitor element is intended for a voltage of about 1–15 kV. A capacitor element with a diameter of 200 mm, a bore diameter of 50 mm and a height of 150 mm, for instance, is intended for a voltage of about 4–10 kV. Voltages of up to about 40 kV can thus be connected across four such capacitor elements coupled in series, as in FIG. 13. In the case the capacitor element comprises metallized films the films preferably consist of polypropene and have a constant thickness that preferably lies in the interval 5–15 micrometer. The electrode layers preferably consist of an alloy of aluminium and zinc and have a surface resistivity that is preferably within the interval 5–40 Ω/□. In the case the capacitor element is of the film-foil type the electrode layers consist of metal foil, preferably aluminium foil, having a thickness that preferably is in the interval 4–6 micrometers. The capacitor element wound to the shape of a roll can be flattened out in certain applications before being connected to other capacitor elements and placed in a container to produce the power capacitor. The invention is applicable to both impregnated and unimpregnated capacitor elements.

The invention is also applicable to capacitor elements in which one or more of the electrode layers is sectioned, i.e. divided into smaller part-areas or segments.

What is claimed is:

1. A capacitor element for a power capacitor including a plurality of films (4, 5; 91, 92, 93) of dielectric material, forming two adjacent dielectric layers, and also a plurality of electrodes (6, 7, 8; 37, 38, 41, 42; 94, 95, 96) of metal material, at least two such electrodes (6, 7; 37, 38; 41, 42; 94, 95) being situated between the two dielectric layers spaced from and alongside each other to define an area (9;

45; 54; 97) that is free from metal material, characterized in that a permanent connection (24; 53; 55; 98) of a dielectric material is arranged in said area (9; 45; 54; 97) and unites the dielectric layers with each other.

2. A capacitor element as claimed in claim 1, characterized in that said connection (98) includes or consists of one of said plurality of films (93).

3. A capacitor element as claimed in claim 1, characterized in that two adjacent films (4, 5) of said plurality of films (4, 5; 91, 92, 93) form said dielectric layer and in that said connection (24; 53; 55) unites the two adjacent films (4, 5) with each other.

4. A capacitor element as claimed in claim 3, characterized in that it is formed by a continuous tape (1; 34) including said two adjacent films (4, 5), said at least two electrodes (6, 7; 41, 42) and additionally at least one electrode (8; 37, 38) of metal material, situated on one side of one of the films (4, 5) facing away from the other film (5, 4) where said area (9; 45), initially in the form of a gap, is defined by opposing surface parts (10, 11; 43, 46) of the two films (4, 5) and inner opposing edges (22, 23; 58, 59) of the two electrode layers (6, 7; 41, 42), which gap (9; 45) extends in the longitudinal direction of the tape (1; 34).

5. A capacitor element as claimed in claim 1, characterized in that said at least two electrode layers have different potentials.

6. A capacitor element as claimed in claim 3, characterized in that said connection is produced by local fusion of said two adjacent films.

7. A capacitor element as claimed in claim 3, characterized in that at least one of said two films includes at least two film-parts that overlap each other in said area, and in that said connection is produced by local union of said two films.

8. A capacitor element as claimed in claim 3, characterized in that said connection includes or is produced by an adhesive.

9. A capacitor element as claimed in claim 3, characterized in that the electric strength of said connection is in parity with the electric strength of said two adjacent films.

10. A capacitor element as claimed in claim 3, characterized in that said plurality of electrodes are deposited on said plurality of films by means of a vaporizing technique or a screen printing technique.

11. A method for producing a capacitor element (30) for a power capacitor, said capacitor element (30) being formed by a plurality of films (4, 5; 91, 92, 93) of dielectric material, forming two adjacent dielectric layers, and also by a plurality of electrodes (6, 7, 8; 37, 38, 41, 42; 94, 95, 96) of metal material, at least two such electrodes (6, 7; 37, 38; 41, 42; 94, 95) being arranged between the two dielectric layers alongside and spaced from each other to define an area (9; 45; 54; 97) that is free from metal material, characterized in that said dielectric layers are united within said area (9; 45; 54; 97) by means of a permanent connection (24; 53; 55; 98) of a dielectric material.

12. A method as claimed in claim 11, characterized in that said connection (98) is formed by one of said plurality of films (93).

13. A method as claimed in claim 11, characterized in that two adjacent films (4, 5) of said plurality of films (4, 5; 91, 92, 93) are united within said area (9; 45; 54) by means of said permanent connection (24; 53; 55).

14. A method as claimed in claim 13, characterized in that the capacitor element (30) is formed by a continuous tape (1; 34) including said two adjacent films (4, 5), said at least two electrodes (6, 7; 41, 42) and additionally at least one electrode (8; 37, 38) of metal material, situated on one side of one of the films (4, 5) facing away from the other film (5, 4) where said area (9; 45), initially in the form of a gap, is defined by opposing surface parts (10, 11; 43, 46) of the two films (4, 5) and inner opposing edges (22, 23; 58, 59) of the two electrode layers (6, 7; 41, 42), which gap extends in the longitudinal direction of the tape (1; 34).

15. A method as claimed in claim 14, characterized in that after said permanent connection (53) has been formed, the tape (34) is wound to a roll so that a second area (54) free from metal material is produced between two consecutive turns of the tape (34), and in that said films (4, 5) are united within said second area (54) by a permanent connection (55) by a dielectric material.

16. A method as claimed in claim 13, characterized in that said films are fused locally to produce said connection.

17. A method as claimed in claim 13, characterized in that at least one of said two films includes at least two film-parts which are caused to overlap each other at least partially in said area, and in that said films are united locally in said area under the influence or pressure and/or heat, to produce said connection.

18. A power capacitor (60) including at least one capacitor element (61) including a plurality of films (4, 5; 91, 92, 93) of dielectric material, forming two adjacent dielectric layers, and also a plurality of electrodes (6, 7, 8; 37, 38, 41, 42; 94, 95, 96) of metal material, at least two such electrodes (6, 7; 37, 38; 41, 42; 94, 95) are situated between the two dielectric layers alongside and spaced from each other to define an area (9; 45; 54; 97) that is free from metal material, characterized in that a permanent connection (24; 53; 55; 98) of a dielectric material is arranged in said area (9; 45; 54; 97) and unites the dielectric layers with each other.

19. A power capacitor (60) as claimed in claim 18, characterized in that the capacitor element (61) includes a plurality of su-elements (73, 74, 75) arranged concentrically in relation to each other, such that the outermost of radially adjacent su-elements has a channel running centrally through it, having circular-cylindrical shape, that closes abuts the innermost sub-element.

20. A power capacitor (60) as claimed in claim 19, characterized in that the number of sub-elements (73, 74, 75) in the capacitor element (61) is uneven and that these are connected in series with each other.

21. A power capacitor as claimed in claim 18, characterized in that it includes a plurality of said capacitor elements having substantially circular-cylindrical shape that are arranged close together so that their axial directions coincide, and are connected to each other so that they form a series-connected capacitor stack.

* * * * *

UNITED STATES PATENT AND TRADEMARK OFFICE
CERTIFICATE OF CORRECTION

PATENT NO.     : 6,594,137 B2
DATED          : July 15, 2003
INVENTOR(S)    : Eriksson It is certified that error appears in the above-identified patent and that said Letters Patent is hereby corrected as shown below:

Title page,
Item [86], please insert:
-- [86]  PCT No.:   PCT/SE01/00036

§ 371 (c)(1),
(2), (4) Date:   October 2, 2002 --.

Column 1,
Line 33, delete "BP 0 789 371 A1" and insert therefor -- EP 0 789 371 A1 --;

Column 6,
Line 22, delete "tape C" and insert therefor -- tape 1 --;

Column 7,
Line 13, delete "371 38" and insert therefor -- 37, 38 --;

Column 12,
Lines 3 and 5, delete "su-elements" and insert therefor -- sub-elements --.

Signed and Sealed this

Fourteenth Day of October, 2003

JAMES E. ROGAN
*Director of the United States Patent and Trademark Office*